United States Patent
Indelicato et al.

(10) Patent No.: US 11,747,115 B2
(45) Date of Patent: Sep. 5, 2023

(54) APPARATUS AND PROCESS FOR DRONE LOCATING, INTERDICTION AND RECOVERY

(71) Applicant: Government of the United States, as represented by the Secretary of the Air Force, Wright-Patterson AFB, OH (US)

(72) Inventors: William Indelicato, Crestview, FL (US); Melvin White, Centerville, OH (US); David Feibus, Dayton, OH (US); Meghan Berlingo, Washington, DC (US); David Beargie, Crestview, FL (US); Nicholas Martin, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 190 days.

(21) Appl. No.: 17/171,340

(22) Filed: Feb. 9, 2021

(65) Prior Publication Data
US 2022/0214144 A1 Jul. 7, 2022

Related U.S. Application Data

(60) Provisional application No. 63/012,340, filed on Apr. 20, 2020.

(51) Int. Cl.
*F41H 11/02* (2006.01)
*G01S 17/66* (2006.01)
*G01S 17/04* (2020.01)

(52) U.S. Cl.
CPC .............. *F41H 11/02* (2013.01); *G01S 17/04* (2020.01); *G01S 17/66* (2013.01)

(58) Field of Classification Search
CPC ........ B64C 39/024; B64F 1/027; F41H 11/04; F41H 11/02; F41H 11/00; F41H 11/05; G01S 17/66; G01S 17/04
USPC .......................................... 250/222.1; 89/1.1
See application file for complete search history.

(56) References Cited

U.S. PATENT DOCUMENTS

| | | | |
|---|---|---|---|
| 10,155,587 B1 * | 12/2018 | Tang | B64C 27/08 |
| 2017/0261604 A1 | 9/2017 | Van Voorst | |
| 2017/0261613 A1 | 9/2017 | Van Voorst | |
| 2017/0261999 A1 | 9/2017 | Van Voorst | |
| 2018/0335779 A1 * | 11/2018 | Fisher | F41G 7/224 |
| 2019/0088156 A1 * | 3/2019 | Choi | G09B 9/003 |
| 2019/0112045 A1 * | 4/2019 | Zhang | B64C 39/024 |
| 2020/0108922 A1 * | 4/2020 | Smith | G05D 1/12 |

(Continued)

*Primary Examiner* — John Cooper
(74) *Attorney, Agent, or Firm* — AFMCLO/JAZ; Jeffrey R. Moore

(57) ABSTRACT

An integrated airspace defense system for identifying and locating a suspicious unmanned aerial vehicle. The system including at least one detection device to monitor the air space and provide a detection information; a computer to process the detection information and identifying the presence of suspicious unmanned aerial vehicles (UAVs) using a sequence of detection algorithms. The integrated airspace defense system identifies and locates the suspicious UAV. In at least one embodiment the integrated airspace defense system is capable of capturing or destroying the suspicious UAV.

9 Claims, 8 Drawing Sheets

(56) References Cited

U.S. PATENT DOCUMENTS

2021/0237898 A1\* 8/2021 Gury ...................... B64D 47/08
2021/0239434 A1\* 8/2021 Gury ....................... G05D 1/12

\* cited by examiner

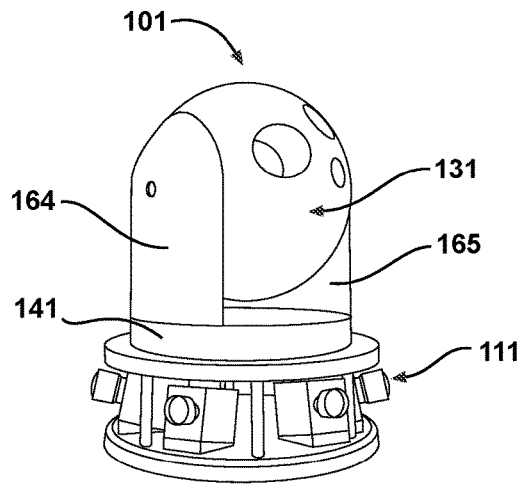
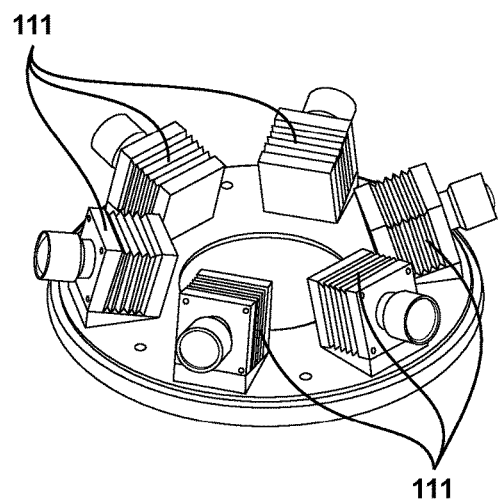
FIG. 1A
FIG. 1B
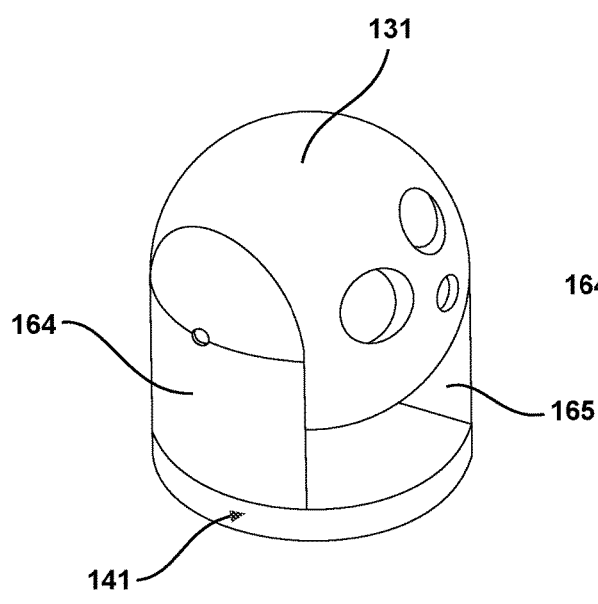
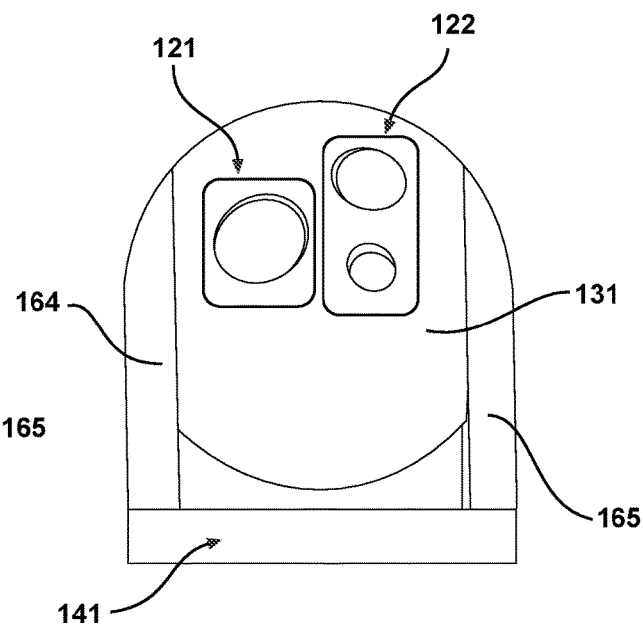
FIG. 1C
FIG. 1D

APPARATUS AND PROCESS FOR DRONE LOCATING, INTERDICTION AND RECOVERY

PRIORITY

Pursuant to 37 C.F.R. § 1.78(a)(4), this application claims the benefit of and priority to prior filed Provisional Application Ser. No. 63/012,340, filed Apr. 20, 2020, which is expressly incorporated herein by reference.

RIGHTS OF THE GOVERNMENT

The invention described herein may be manufactured and used by or for the Government of the United States for all governmental purposes without the payment of any royalty.

FIELD OF THE DISCLOSURE

Disclosed is an integrated defensive system to defend an area on land or sea from hostile or unauthorized small Unmanned Aerial Systems (sUAS), and are referred to herein as Unmanned Aerial Vehicles (UAV) or drones, using apparatus and/or process for drone locating, interdiction and recovery. The system includes UAV detection, capture or destruction, and recovery.

SUMMARY OF THE INVENTION

The system includes a detection device also known as the "Panotect", and an interdiction drone also known as the "Stone Drone." The interdiction drone may be configured with an armored shell. Alternatively a net capture system may be used with a pursuit drone. An accompanying beacon device illustrates a unique aspect of the drone defensive system recovery.

The disclosed Apparatus and Process for Drone Locating, Interdiction and Recovery may include the integration of the systems disclosed herein including an integrated airspace defense system (IADS) for identifying and locating a suspicious unmanned aerial vehicle, the system including at least one detection device to monitor the air space and provide a detection information and a computer to process the detection information and identifying the presence of suspicious unmanned areal vehicles (UAVs) using a sequence of detection algorithms. The integrated airspace defense system is designed to identify and locate the suspicious UAV. The detection device is at least one wide-field of view camera; the camera connected to a computer controlled pan tilt unit. The pan tilt unity may further including a at least one targeting camera co-aligned to operate with a laser range finder; and wherein the detection information includes at least one image.

The integrated airspace defense system may interdict and capture the suspicious UAV with a capture UAV and the capture UAV may include a net system assembly having at least one net and a Cross Frame connected to a spindle by a first side panel and a second side panel, such that the spindle may rotate and deploy at least one net upon a command using a power and control connector. The spindle rotation enabled by a rotation servo, the spindle further including an attachment means wherein the at least one net is operably releasable from the spindle; and a first attachment bracket and a second attachment bracket wherein the brackets are separated and operably connected to the capture UAV and wherein the deployed net entangles the suspicious UAV. The deployed net may then subsequently released from the capture UAV. The attachment means may be magnets. A second net may then be deployed to capture a second suspicious UAV.

A recovery locator beacon (recovery beacon or beacon) may be attached to the net for locating the entangled suspicious UAV. The recovery beacon may include a protective housing, a spring contact switch, and or a rip-away cord such that when deployed the spring contact electrically connects a connecting circuitry with a power source such that the recovery beacon may be activated. The recovery beacon rip-away cord may include an attachment loop. The recovery beacon may in one embodiment include exterior lights that are powered on when the recovery beacon is activated, in one embodiment using a power switch. The recovery beacon may further include a test button and/or a test indicator light to assist in recovery. The recovery beacon may further include a siren to assist in recovery. The recovery beacon may further include a radio frequency antenna for transmitting a signal that is designed to assist in recovery.

The integrated airspace defense system (IADS) may in one embodiment incapacitate the suspicious UAV with an interdiction (stone or stone drone) UAV. The interdiction UAV may include a stone frame, at least one battery. a wireless charging capability. The battery operably connected to at least one motor to drive at least one propeller using an electronic control unit and a power distribution board, a global positioning system (GPS) antenna, an optical camera capable of autopilot connected through a radio link; and an armored shell. The shell being operably designed to remove from the airspace the suspicious UAV upon contact. In one embodiment the suspicious UAV airspace removal is performed with a kinetic impact of the interdiction UAV with the suspicious UAV.

BRIEF DESCRIPTION OF THE DRAWINGS

FIG. 1A is an illustration of a drone detection device;

FIG. 1B is an illustration of the drone detection device optical wide field of view cameras;

FIG. 1C is an illustration of the drone detection device moveable housings including the pan tilt housing and pan base;

FIG. 1D is an illustration of the drone detection device camera and range finder;

Figure 2A:
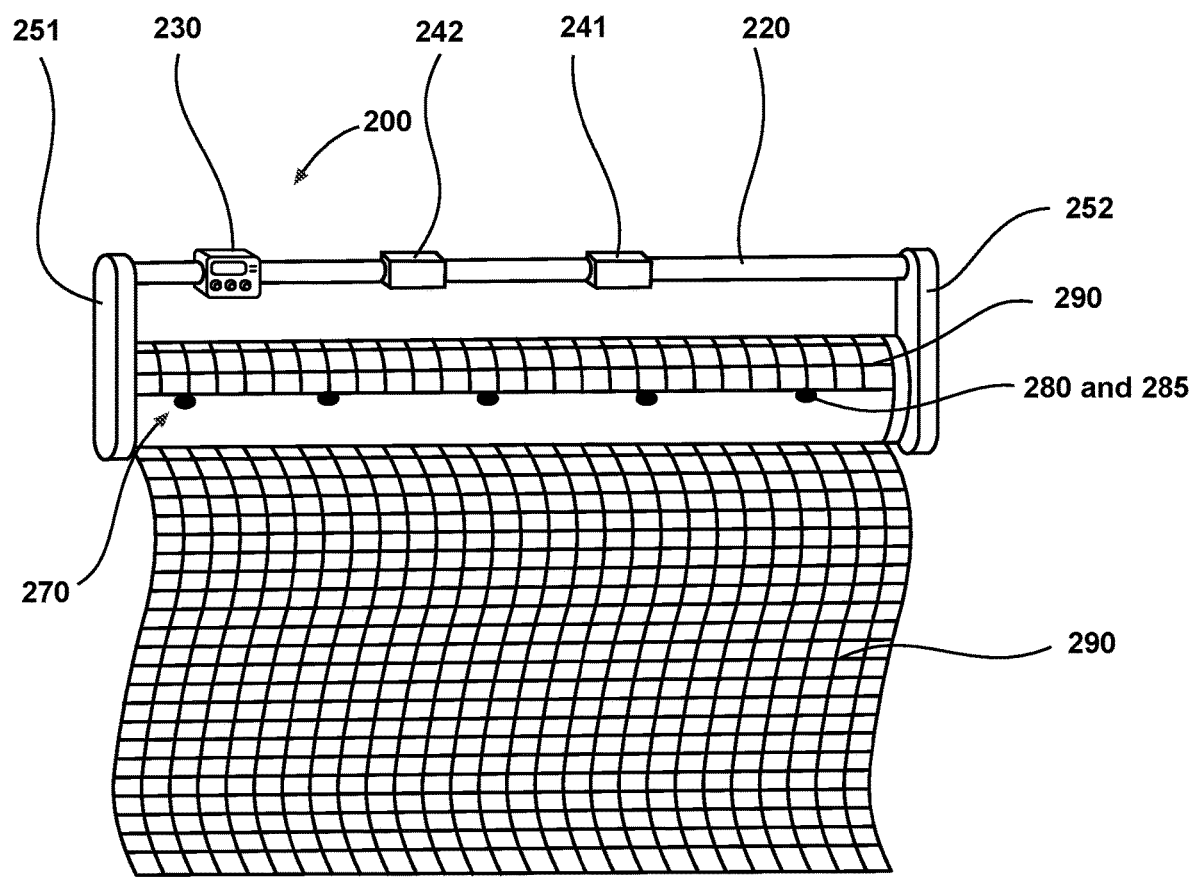
FIG. 2A is an illustration of the net system assembly.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

A drone detection system, also known as the "Panotect", provides Security Forces (SF) and other defense and law enforcement personnel a quick and effective solution for detecting, identifying, and tracking small Unmanned Aerial Systems (sUAS). Small UASs are categorized as class I and II drones (under 55 lbs), and are referred to herein as UAVs or drones. Without a drone detection system in place, there is no method for notifying when these small UAVs fly onto bases or into other secure areas. Currently, of the suggested methods for detecting and identifying the growing threat of hostile UASs, many are impractical for a variety of reasons, including cost of scaling a system or limited detection ranges. This system solves these issues and can be placed around military bases, government installations, or integrated as a component to a wide range of defense networks; multiple systems can be linked together to cover a larger area. This system is also able to be mounted on a mobile platform such as a vehicle for convoy protection.

FIG. 1A shows a drone detection device 101. An installed drone detection system may include one or more drone detection devices 101 deployed as needed to provide coverage and monitor a protected air space (not shown) from hostile UAVs. The detection device 101 may be stationary or mobile. The drone detection device 101 may include a computer-controlled pan-tilt unit (PTU) housing 131. The drone detection device 101 may further include one or more of the wide field of view cameras 111.

FIG. 1B illustrates an embodiment of one arraignment envisioned including and internal ring of wide field of view optical cameras 111. A computer (not shown) may be connected to the cameras to processes camera images with a sequence of detection algorithms to determine if a hostile UAV is present.

FIG. 1C shows a computer-controlled pan-tilt unit (PTU) housing 131. The PTU housing 131 includes a palming base 141 that allows the PTU 131 to pan (left and right) and tilting side panels 164 and 165 that allow the PTU 131 to tilt (up and down).

In one embodiment the PTU 131 may include at least one targeting camera 121 that is coaligned with a laser rangefinder 122 as shown in FIG. 1D. The targeting camera 121 may have a narrow field of view or otherwise adapted to operationally function with the laser range finder 122.

The process of initial detection begins when a target is detected by one or more of the wide field of view cameras 111. A computer connected to the cameras processes the images with a sequence of detection algorithms to determine a possible target. Night detections are possible due to the common use of onboard lighting on UAV systems, necessary for the remote piloting and/or navigation of the UAV. Once a possible hostile UAV is detected, its heading and elevation angle are passed to a computer-controlled pan-tilt unit (PTU) 131. The PTU is equipped with the narrow field-of-view camera 121 that is co-aligned with the laser rangefinder 122. The imagery from the narrow field-of-view camera 121, along with a second set of optical detection algorithms, is used to provide fine control to the PTU so that the laser rangefinder can get an accurate range measurement of the hostile UAV. The computer uses the azimuth, elevation, and range of the target to determine its position in a global coordinate frame. The target position, speed, and size are used to differentiate between UAVs and clutter such as birds, clouds, planes, etc. through the combination of passive and active optical detection. After a target is detected, tracked, and characterized as a hostile UAV, the computer transmits the target information to alert defense personnel or automated defensive systems of the target.

The individual components and materials can be swapped out for alternatives, allowing different configurations and upgrades. Combined with an effective UAV engagement solution, this system can protect installations and bases, both permanent and rapidly constructed. This system can also be employed to identify hostile UAVs for convoys and dismounted personnel, important buildings, stadiums, and public spaces. The power for the detection system can either be provided by an electrical battery in the case of a temporary or vehicle-mounted system or connected to mains power as a more permanent solution.

This system uses a passive optical detection cycle followed by active optical tracking. Prior systems used sensors other than optical cameras for primary detection, and optical detection was cited as incapable of reliable and precise detection of UAVs. This system demonstrates optical detection is as capable as and less expensive than alternative detection methods, primarily radar systems.

Net & Spindle

Interdiction of hostile small Unmanned Aerial Systems (sUAS) may be performed with a modified or dedicated airborne platform. Small UASs are categorized as class I and II drones (under 55 lbs), and may be referred to herein as Unmanned Aerial Vehicles (UAVs) or drones. One such method for interdiction and capture is with an entangling net, suspended from a spindle system.

As shown in FIG. 2A, a net system assembly 200 may be attached to the defending UAV, below the rotors 515 and above the landing gear 520 (See FIG. 2C). The net system assembly 200 may be used to stop intruding small UAVs by entangling them in a net 290 when flown into their propellers or lifting surfaces. With the use of multiple rolled deployable nets 290, the net system assembly 200 may engage multiple intruding UAVs.

As shown in FIG. 2A, the net system assembly 200 is supported by a cross frame 220 and connects to its capture UAV through attachment brackets 241 and 242, and supports the rest of the spindle with side panels 251 and 252. Power and control are passed through connector 230, wherein the brackets 241 and 242 are separated and together operably connected to the UAV. The frame 220 and side panel components 251 and 252 are connected to a spindle 270 by such that a spindle 270 may rotate and release on command a net 290.

Figure 2B:
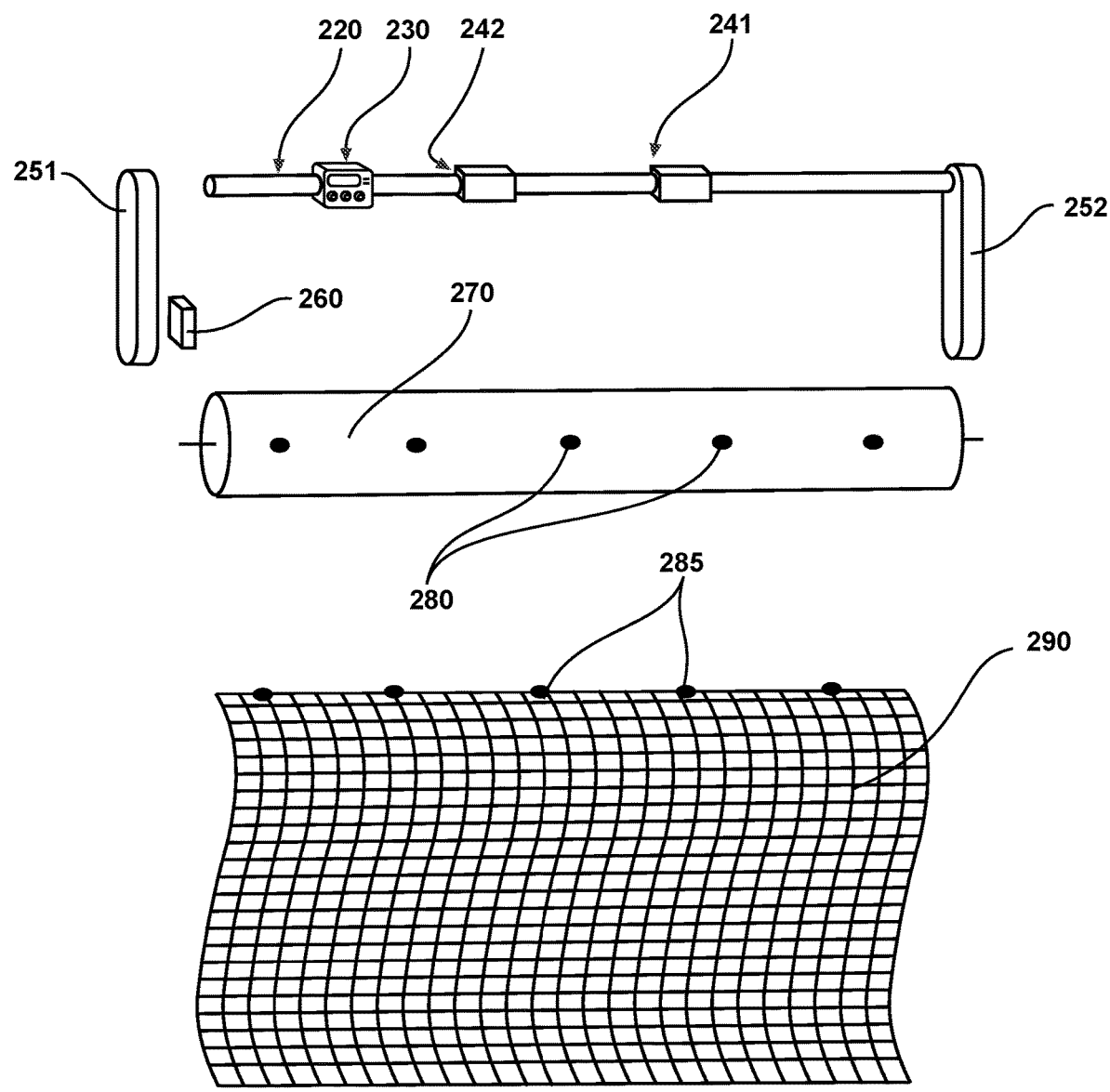
FIG. 2B is an exploded illustration of the net system assembly with separated net.

FIG. 2B shows the spindle 270 attaching to the frame assembly, and rotation may be enabled by a rotational servo 260. The spindle 270 further includes spindle magnets 280 which attach to the net magnets 285, wherein the net(s) 290 is operably releasable from the spindle 270, when driven by the rotational servo 260.

The FIG. 2B cross frame 220 and connects to its capture UAV through attachment brackets 241 and 242, and supports the rest of the spindle with side panels 251 and 252. Power and control are passed through connector 230, wherein the brackets 241 and 242 are separated and together operably connected to the UAV. The frame 220 components are connected to a spindle 270 by such that a spindle 270 may rotate and release on command a net 290.

In one embodiment the spindle 270 of FIG. 2B may have one or more modes of operation including for example loading and unfurling/entangling. During loading operations, the spindle 270 counter-rotates, and the net magnets 285 attached to the spindle magnets 280 and to subsequent net magnets, loading in succession. The spindle 270 maintains the net(s) 290 in a loaded and rolled up configuration during stand-by and transit flight (See FIG. 2C). When the capture UAV is pursuing a target, the first net 290 is unfurled to its full length by rotating the spindle 270. Once the target is engaged, the net 290 will detach automatically from the net magnets 285 separating, and then the next net (290A FIG. 2D) on the spindle 270 may be unfurled as needed.

In one embodiment, the net system assembly 200 hangs below the capture UAV (See FIG. 2C) to be above and out of the way of the landing gear, and below and out of the way of the rotors/propellers 515. The cross frame 220 keeps the main structure sturdy and enables spindle operations and rotations without pinching. The net assembly connects to the capture UAV through attachment brackets 241 and 242, with power and control through connector 230. In this manner the net system assembly can be connected and disconnected from the capture UAV for configuration and maintenance (not shown).

Figure 2C:
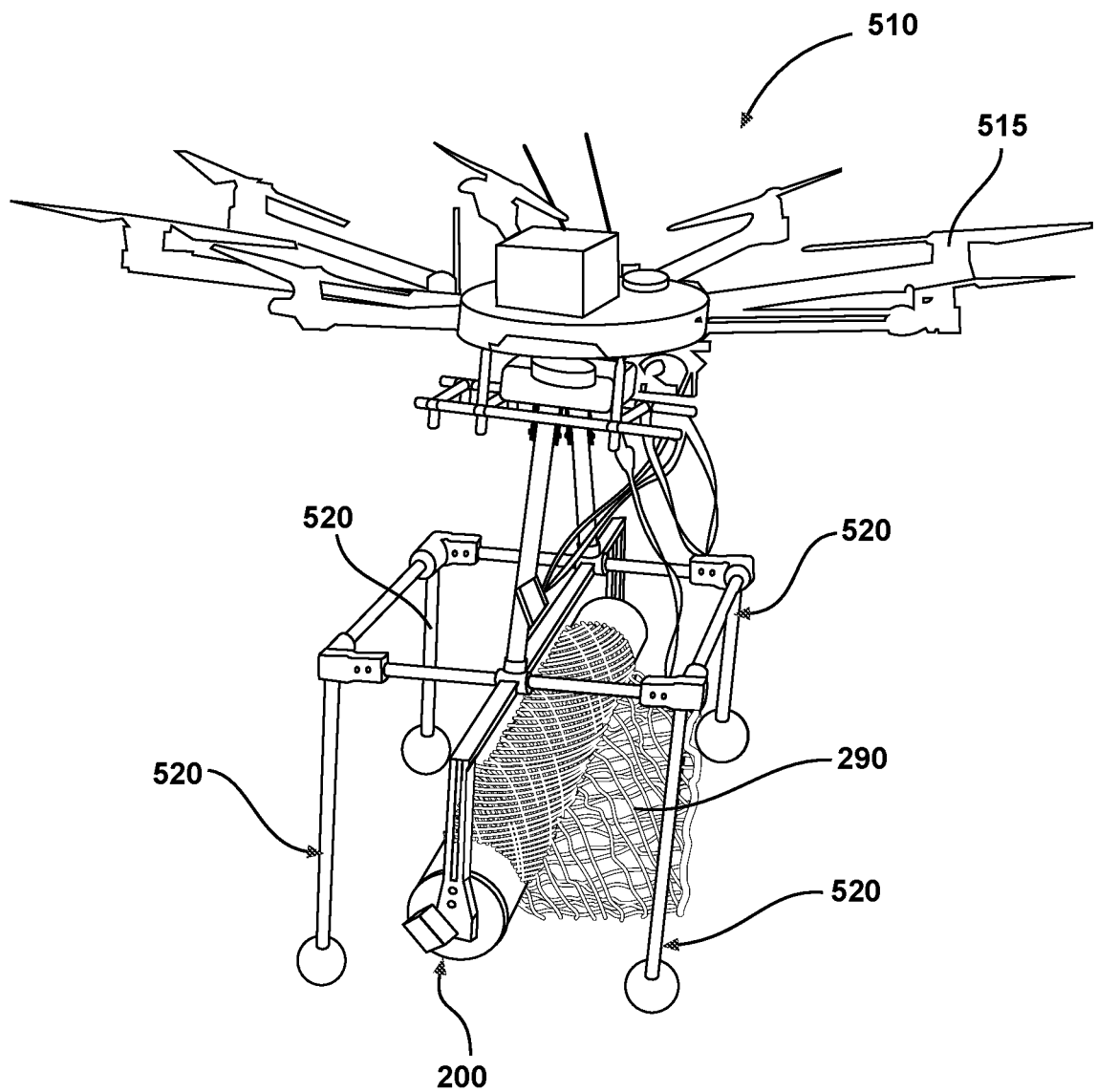
FIG. 2C is an illustration of a pursuit drone equipped with a net system assembly.

As shown in FIG. 2C capture drone 510 includes capture drone rotors 515 which are mounted above the net system assembly 200 to keep the net 290 away from the capture drone rotors 515. Landing gear 520 are designed to also keep the net 290 away from the capture drone rotors 515 and off the landing surface, allowing the landing gear to touch down first, level and such that the net remains its distance from the capture drone rotors 515.

Figure 2D:
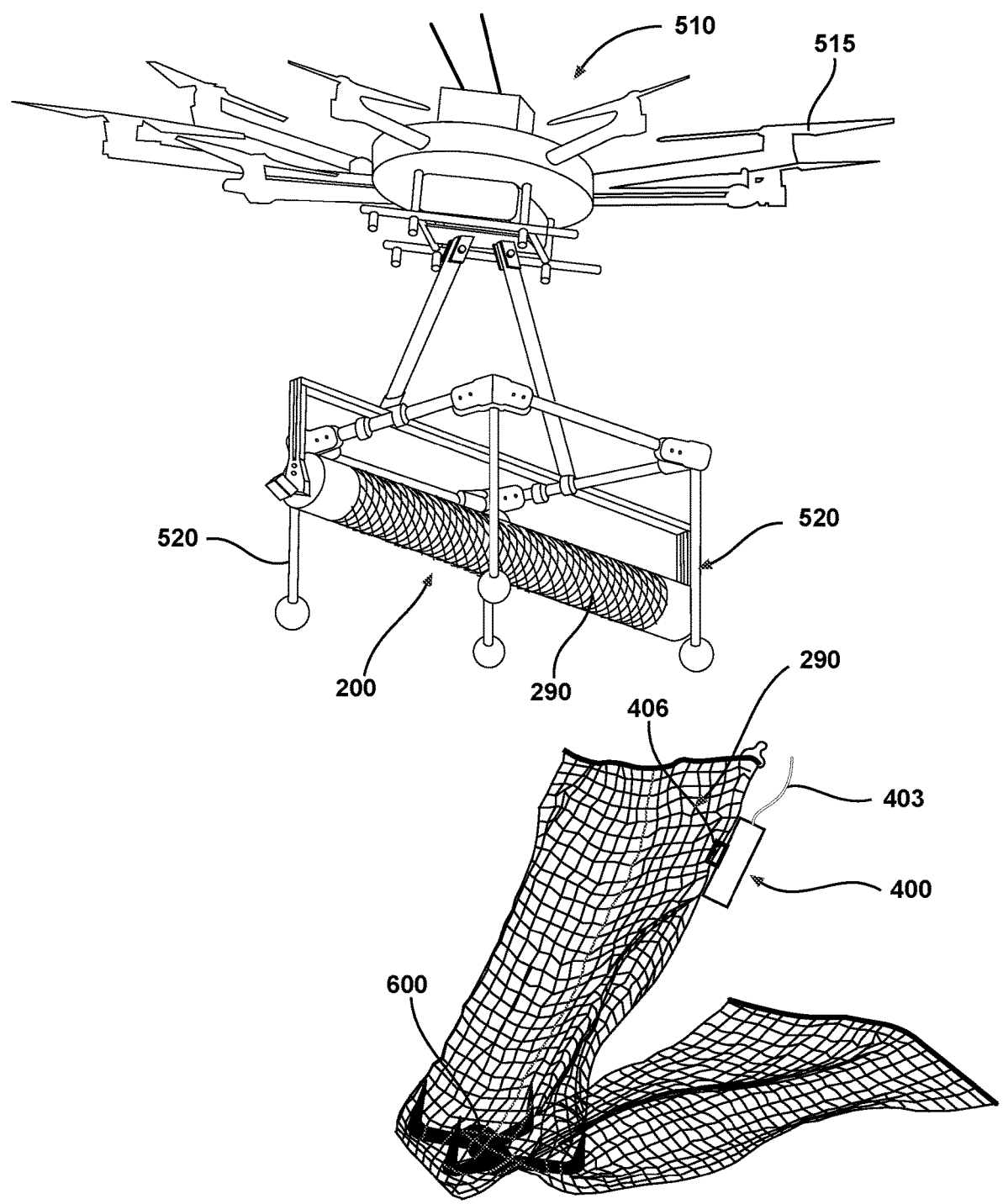
FIG. 2D is an illustration of a pursuit drone equipped with a net system assembly capturing a drone.

FIG. 2D illustrates a capture drone 510 with rotors 515 immediately after netting a hostile drone 600 is entangled in a net 290 have a recovery beacon 400 attached by attachment loop 406, the recovery beacon 400 trailing the rip-away cord 403. Further illustrated is a second net 290A ready to deploy from the net system assembly 200 in the pursuit of other hostile drones (not shown).

The system uses common light-weight materials, the specifics for the frame and net material depend upon the size desired and the speed of engagement. The individual components and materials can be swapped out for alternatives, allowing different configurations and upgrades. The configuration of the capture UAV may use UAV components, including frames, controllers, motors, autopilot systems, additional computer controllers, cameras, and associated software (none shown). The individual components and materials can be swapped out for alternatives as improvements and upgrades in drone technology allow. Initial configuration of the capture UAV include an airborne platform based upon a modified DJI S1000 using a Pixhawk autopilot, an onboard Raspberry Pi computer to interface with the autopilot and communications, a first person vision (FPV) camera for flight control, and the Drone kit API to create precision guidance system. The capture UAV with net assembly systems can be pre-positioned around an installation for rapid interception of intruding hostile UAVs. Prior UAV interception devices relied on static or single use net systems; this system improves the usage for multiple encounters.

Figure 3A:
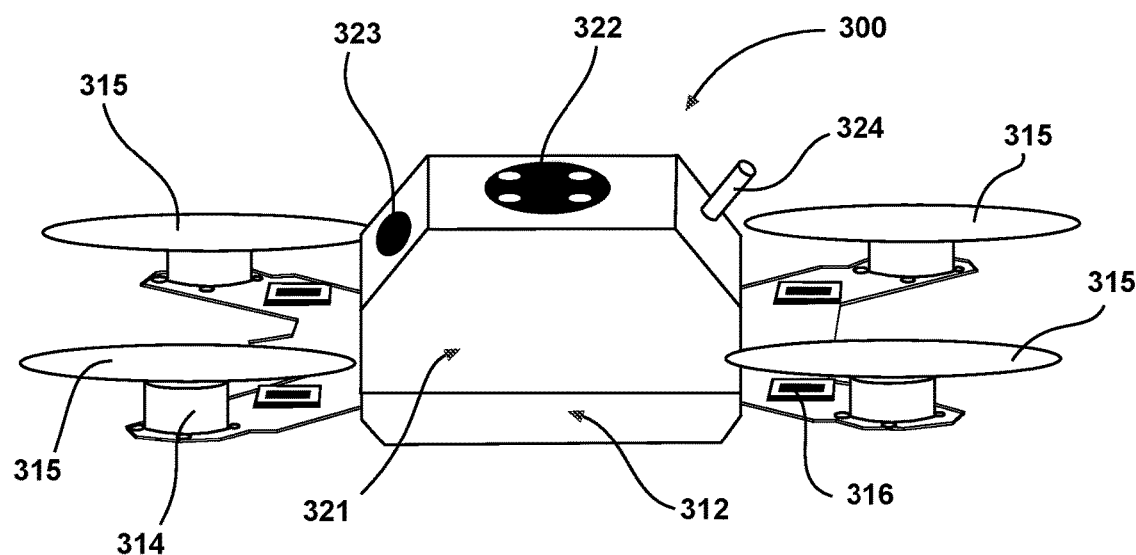
FIG. 3A is an illustration of the interdiction "stone" drone.
Figure 3B:
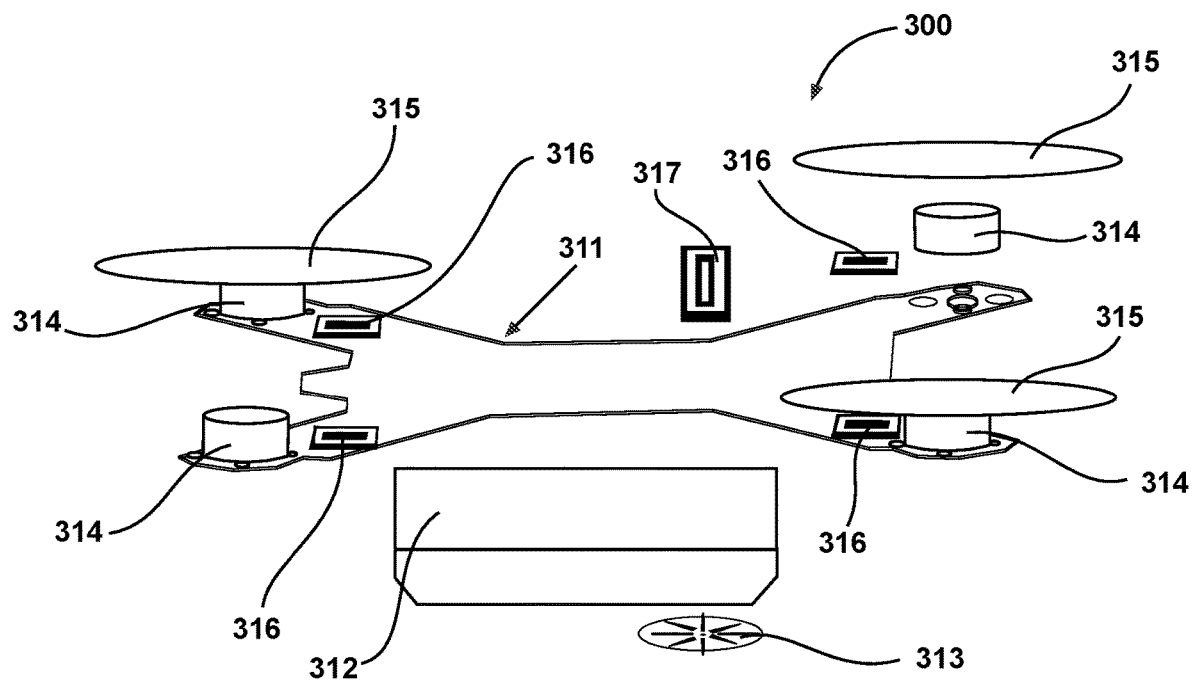
FIG. 3B is an exploded illustration of the "stone" drone elements.
Figure 3C:
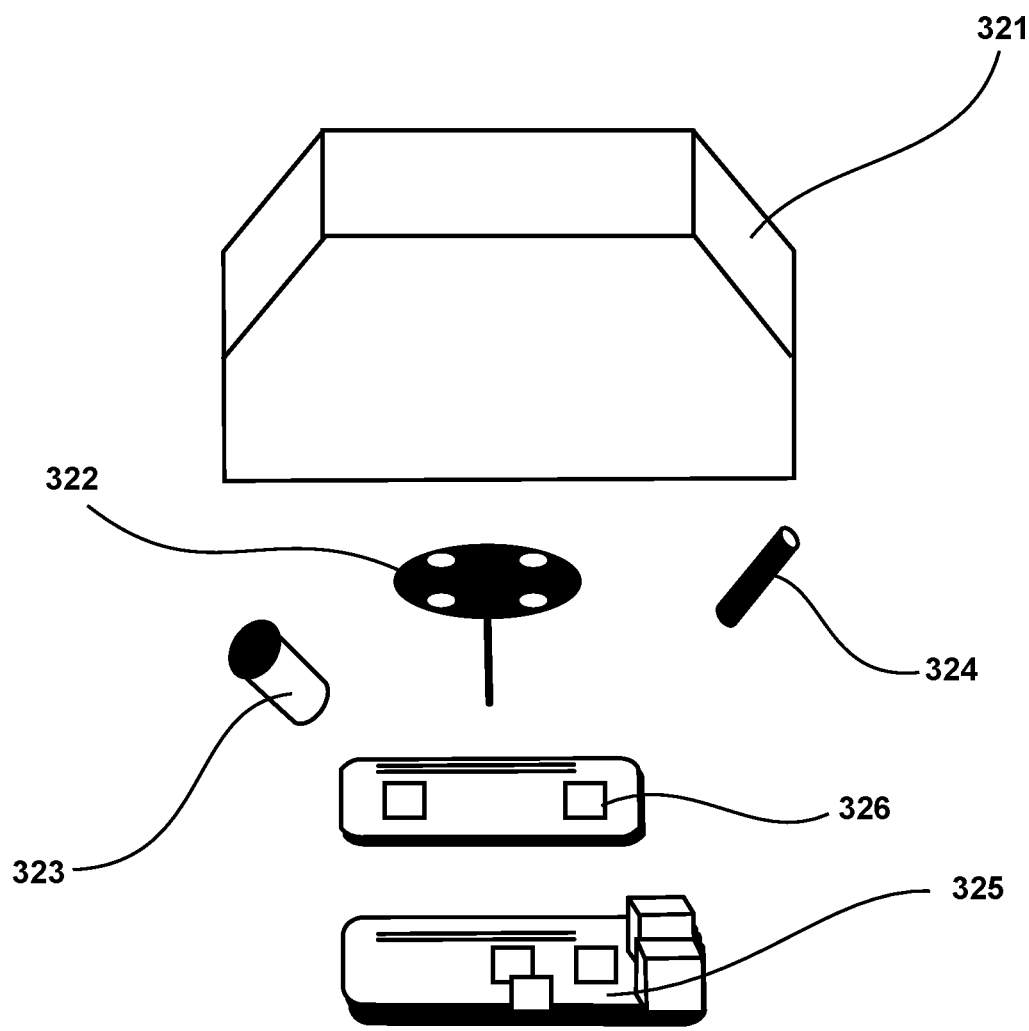
FIG. 3C is another exploded illustration of the "stone" drone elements with armored shell.

As shown in FIG. 3A, FIG. 3B and FIG. 3C the capture drone 300 may include a Frame 311, Batteries 312, Wireless Charging 313, one or more motors 314, one or more propellers 315, one or more electronic control units 316, at least one power distribution board 317, a GPS antenna 322, an optical camera 323, a radio link 324, a microcontroller 325, and an autopilot 326, all operably connected as known in the art. The components preferably are of sufficient lifting power to carry the net system and overtake or intercept the target drone. Further, as shown in FIG. 3B and FIG. 3C the capture UAV 300 may be hardened with an armored shell 321 (FIG. 3C) to enable repeat uses of primary systems.

Interdiction Drone

An interdiction drone, also known as the "Stone Drone", provides Security Forces (SF) and other defense and law enforcement personnel a quick and effective solution to intruding small Unmanned Aerial Systems (sUAS). Small UASs are categorized as class I and II drones (under 55 lbs), and shall be referred to herein as Unmanned Aerial Vehicles (UAVs) or drones. Without a system in place, there is nothing to stop these small drones from coining onto bases or into secure areas, and disrupting operations, gathering intelligence, or delivering hazardous payloads to soft targets. These interdiction drones may be placed around military bases, government installations, or built into convoy operations to provide dismounted soldiers protection in the field. This interdiction drone uses a simple approach, using a kinetic strike to engage a potential or confirmed hostile threat, and eliminating the hazard before there is injury, accident, or casualty.

FIG. 3A is an illustration of the interdiction drone 300. FIG. 3B and FIG. 3C are an exploded illustration of a stone drone 300 showing the various components including a frame 311, preferably optimized for speed, coupled with motors 314 and propellers 315. The power source is an electrical battery 312, which uses wireless charging 313 while in the stored, stand-by state. The electricity is distributed through a power distribution board 317, and each motor is controlled by an associated electronic control unit 316. These components represent a high-speed drone set up, and can be built using common industry components; high speed operations may be preferred to pursue and overtake potential targets and provide enough kinetic impact force to de-flight the targets. Together these components would enable high speed, quick agility pursuit.

On top of this frame is an armored shell 321 as illustrated in FIG. 3C, containing the controller and input parts. The central piece is the microcontroller 325, which handles all the computation and processing for the drone. Guidance is directed by the GPS antenna 322, and instructions and directions come in through the radio link antenna 324, which also transmits images and status updates to the ground station. The microcontroller receives images through the camera 323, and communicates to the autopilot 326.

During a standard operation, the interdiction (stone) drone 300 would receive a go signal from the ground station, with the location of the intruding hostile drone to fly to and intercept. Powering up, the drone 300 would lift off and begin flying to the intercept area. Once at a nominal distance, the microcontroller would begin processing images, searching for the intruding target based upon characteristics passed on from the ground station. One key characteristic of the search is the camera 323 facing upward, to detect the hostile drone against the sky background, rather than tracking against ground or horizon clutter. Images and status updates are transmitted back to the ground station, and the interdiction drone can receive further guidance updates while in flight. Once the hostile drone is detected, identified, and tracked, the microcontroller would begin updating the autopilot with directions, in turn guiding the drone into the path and colliding with the intruder. At high speed, this kinetic collision would be enough to damage and de-flight a hostile drone. The armored shell 321 would protect the sensitive components inside, allowing for multiple uses from these parts, but all of the components are selected and priced to enable disposable operations if necessary. The drone can remain in its stand-by housing until needed, receiving necessary electrical power through its charging pad until it is used.

The armored shell 321 may be made of any material known in the art including aluminum, steel, plastic, and fiber composite. The armored shell 321 is preferably strong enough to disable a hostile drone on impact and preferably protect the vital components of the delivery drone 300 (FIG. 3A) from disabling damage while maintaining proper flight characteristics including high speed and maneuverability.

The interdiction drone 300 may have individual components and materials swapped out for alternatives, allowing different configurations and upgrades to be implemented into the defensive shield. The kinetic solution is preferable to other systems and products that either used illegal (RF jamming, Lasers) or overly complicated, and represents the simplest and fastest resolution to an intruding threat. With an accompanying detection device as discussed above and as part of an integrated defensive UAV system, the interdiction drone may protect any and all installations and bases, both permanent and rapidly constructed, as well as convoys and dismounted personnel, from the threat of attacking sUASs/UAVs. This system can also be employed on a much larger commercial scale, protecting important buildings, stadiums, and public spaces.

Recovery Beacon

Figure 4A:
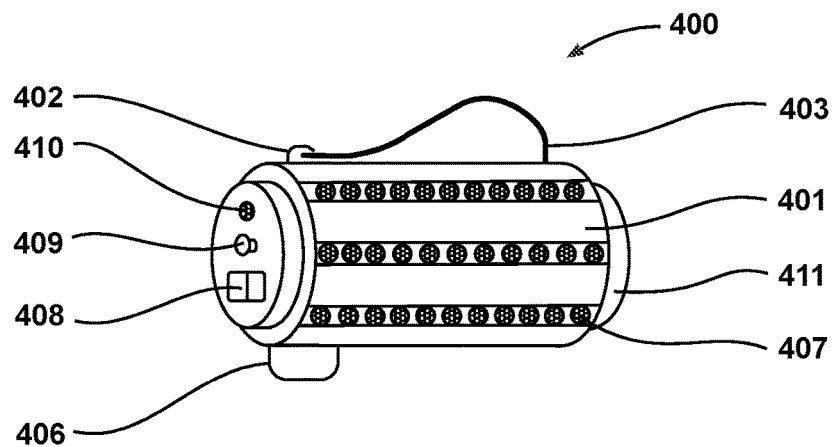
FIG. 4A is an illustration of a recovery beacon.

Recovery of downed and netted suspicious (hostile) small Unmanned Aerial Systems (sUAS), also referred to herein as Unmanned Aerial Vehicles (UAVs) and drones, may be assisted by the use of a beacon device. As shown in FIG. 4A, presented in an exploded illustration in FIG. 4B, a recovery beacon 400 provides location and detection of the de-flighted UAVs brought down by the methods and apparatus discussed above. The beacon 400 enables Security Forces (SF) and other responders to quickly and accurately identify and locate an object, day or night, in all weather conditions and in all environments. The initial use is to locate downed intruding UAVs when captured, such as illustrated above with a releasable net.

Figure 4B:
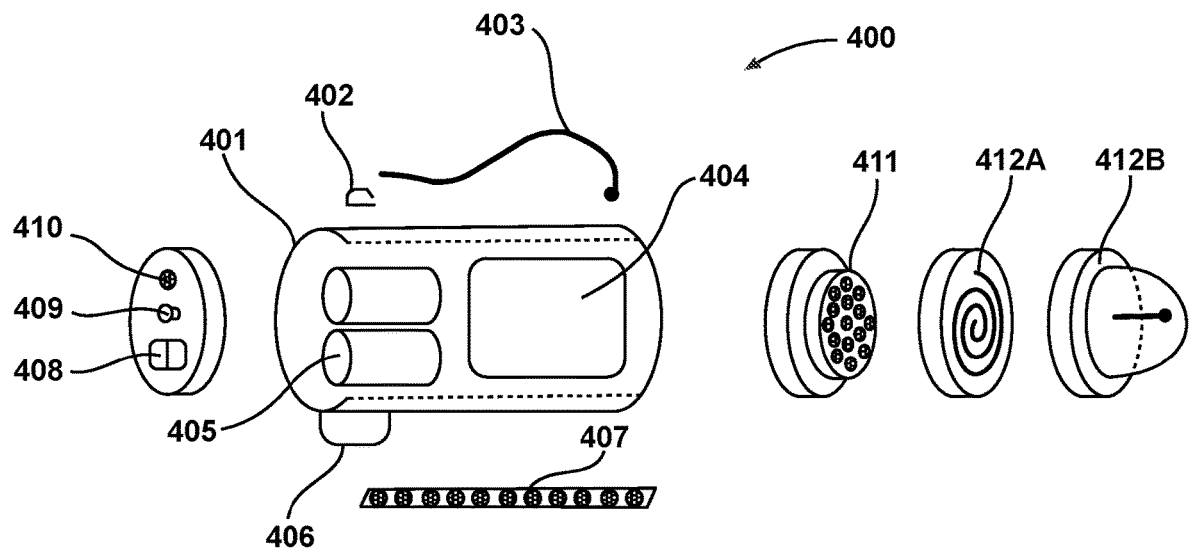
FIG. 4B is an exploded illustration of a recovery beacon.

As shown in FIG. 4A and exploded illustration FIG. 4B the recovery beacon 400 is built on a protective housing 401. Inside is a power source 405 and electronic circuitry 404, connecting the power with a triggering mechanism including a spring contact switch 402, powering the recovery beacon when a rip cord 403 is pulled away from the spring contact switch 402. When the rip cord is ripped away it is designed to complete a contact circuit with spring contact switch 402 and activates the recovery beacon 400.

An arming mechanism may include a recessed power switch 408, and/or a test button 409 and test light 410 to verify the beacon will activate when deployed.

An alarm system may include a plurality of exterior lights 407, set up to enable visual location, day and night, no matter what orientation the beacon lands in. The exterior lights 407 may be light emitting diodes (LED), which can be infrared (IR) LEDs if covert recovery is desired. In addition, there are several modules that can be attached, depending upon mission and location needs, including a siren 411 and an RF antenna 412A and transmitter 412B (two configurations shown). An opposing attachment loop 406 may be used to secured the recovery beacon 400 to a fall away net 290 (FIG. 2D) to a subsequent fall away net 290A or other capture device (not shown).

In one embodiment, an attachment loop 406 sticks out from the case 401, allowing the recovery beacon to be securely connected to a net 290 or other system. To arm the beacon 400, there may be a recessed power switch 408. To assist in verifying the arming, if the rip cord 403 is in place with the contact switch 402 (i.e. the beacon is in place but not activated/sounding), the test button 409 and/or test light 410 may be used to verify the beacon will activate when deployed. On the exterior of the beacon, multiple exterior lights 407 are set up to enable visual location, day and night, no matter what configuration the beacon lands in. IOE the exterior lights are light emitting diodes (LED), which can be infrared (IR) LEDs if covert recovery is desired. In addition, there are several modules that can be attached, depending upon mission and location needs, including a siren 411 and an RF antenna and transmitter 412 (two configurations shown).

To use the recovery beacon 200, batteries 405 may be inserted and the selected locator module (411 and/or 412) may be connected. With the power switch 408 off the rip cord 403 is linked to the spring clip 402 through a net 209 or strut (not shown) (ex. the surface the beacon and net will detach from). The opposing attachment loop 406 is secured to the associated fall-away net 409 or other releasing device (not shown). The power switch 408 is turned on, and the beacon 400 can be verified everything is working by pressing test button 409 and checking the test light 410. The beacon is now armed and ready to be used. In its current stand by configuration, it can remain deployed on the net system until it is used in an engagement. When in use, when a net 290 entangles with an intruding UAV and separates from the net system assembly 200, the recovery beacon's rip cord 403 will be pulled from the spring clip 402, completing the electrical circuit. The external lights 407 and locating module 411 or 412 will be exciting, allowing recovery personnel to locate the beacon for recovery.

The recovery beacon 400 was created after feedback from SF personnel and other responders, describing the problems and challenges faced when trying to locate a downed UAV after an intrusion engagement. The recovery beacon may provide several forms of notification, including visual and auditory, enabling both location identification and hazard warning for responders. It is built with common circuitry elements, but the whole package hasn't been put together before nor has a similar device been used in the field for recovery aspects. The beacon can be made with alternative materials and components, enabling flexible configurations, while the same mission effects can be reached. With alternative triggering mechanisms, the beacon can be used in a wider range of scenarios, such as an impact trigger to help recover friendly UASs following a crash, or identifying where friendly resupply packages are located in field.

While the present invention has been illustrated by a description of one or more embodiments thereof and while these embodiments have been described in considerable detail, they are not intended to restrict or in any way limit the scope of the appended claims to such detail. Additional advantages and modifications may readily appear to those skilled in the art. The invention in its broader aspects is therefore not limited to the specific details, representative apparatus and method, and illustrative examples shown and described. Accordingly, departures may be made from such details without departing from the scope of the general inventive concept.

We claim:

1. An integrated airspace defense system (IADS) for identifying and locating a suspicious unmanned aerial vehicle, the system including:

at least one detection device to monitor the air space and provide a detection information;

a computer to process the detection information and identifying the presence of suspicious unmanned aerial vehicles (UAVs) using a sequence of detection algorithms;

the integrated airspace defense system identifies and locates the suspicious UAV;

the integrated airspace defense system interdicts and captures the suspicious UAV with a capture UAV; the capture UAV including a net system assembly having at least one net;

a Cross Frame connected to a spindle by a first side panel and a second side panel, such that the spindle may rotate and deploy at least one net upon a command using a power and control connector, the spindle rotation enabled by a rotation servo, the spindle further including an attachment means wherein the at least one net is operably releasable from the spindle; and a first attachment bracket and a second attachment bracket wherein the brackets are separated and operably connected to the capture UAV, wherein the deployed net entangles the suspicious UAV; the deployed net subsequently released from the capture UAV and; the attachment means are magnets.

2. The integrated airspace defense detection system of claim 1 wherein;
the detection device is at least one wide-field of view camera; the camera connected to;
a computer controlled pan tilt unit;
the pan tilt unity further including a at least one targeting camera co-aligned to operate with a laser range finder; and wherein
the detection information are at least one image.

3. The integrated airspace defense system of claim 1 wherein; a second net is deployed to capture a second suspicious UAV.

4. The integrated airspace defense system of claim 1 wherein attached to the net is a recovery locator beacon for locating the entangled suspicious UAV; the recovery beacon including:

A protective housing, a spring contact switch, a rip-away cord such that when deployed the spring contact electrically connects a connecting circuitry with a power source such that the recovery beacon is activated.

5. The integrated airspace defense system of claim 4 wherein the recovery beacon rip-away cord includes an attachment loop.

6. The integrated airspace defense system of claim 4 wherein the recovery beacon includes exterior lights that are powered on when the recovery beacon is activated Power Switch.

7. The integrated airspace defense system of claim 4 wherein the recovery beacon further includes a test button and a test indicator light to assist in recovery.

8. The integrated airspace defense system of claim 4 wherein the recovery beacon further includes a siren to assist in recovery.

9. The integrated airspace defense system of claim 4 wherein the recovery beacon further includes a radio frequency antenna for transmitting a signal and assist in recovery.

* * * * *